(12) United States Patent
Chapin

(10) Patent No.: US 6,876,864 B1
(45) Date of Patent: Apr. 5, 2005

(54) SOFTWARE-DEFINED WIRELESS COMMUNICATION DEVICE

(75) Inventor: John Chapin, Arlington, MA (US)

(73) Assignee: Vanu, Inc., Cambridge, MA (US)

( * ) Notice: Subject to any disclaimer, the term of this patent is extended or adjusted under 35 U.S.C. 154(b) by 387 days.

(21) Appl. No.: 10/099,731

(22) Filed: Mar. 15, 2002

Related U.S. Application Data

(60) Provisional application No. 60/276,002, filed on Mar. 15, 2001.

(51) Int. Cl.$^7$ .................................................. H04B 7/00
(52) U.S. Cl. .................. 455/509; 455/550.1; 455/510; 455/512
(58) Field of Search ............................... 455/418, 419, 455/420, 552.1, 509, 510, 550.1, 512; 375/259, 302, 320; 370/282; 324/322

(56) References Cited

U.S. PATENT DOCUMENTS

| | | | |
|---|---|---|---|
| 6,052,600 A | * | 4/2000 | Fette et al. ................. 455/509 |
| 6,181,734 B1 | * | 1/2001 | Palermo ...................... 375/219 |
| 2002/0144134 A1 | * | 10/2002 | Watanabe et al. ........... 713/191 |

FOREIGN PATENT DOCUMENTS

WO     WO 99/10976     3/1999

* cited by examiner

*Primary Examiner*—Lester G. Kincaid
*Assistant Examiner*—Phuoc Doan
(74) *Attorney, Agent, or Firm*—Ropes & Gray LLP

(57) ABSTRACT

A software-defined wireless communication device is disclosed that includes a hardware platform, which can be digital or analog, as well as platform software that manages the hardware profile and waveform software that manages the signal processing functions. The software-managed hardware profiles are decoupled from the signal processing functionality of the software. In this way, waveform software can be certified, for example for compliance with FCC emissions requirement, independently from the platform software and from the hardware on which the waveform software runs.

12 Claims, 2 Drawing Sheets

SOFTWARE-DEFINED WIRELESS COMMUNICATION DEVICE

CROSS-REFERENCE TO OTHER PATENT APPLICATIONS

This application claims the benefit of U.S. provisional Patent Application No. 60/276,002, filed Mar. 15, 2001, the content of which is incorporated herein by reference.

FIELD OF THE INVENTION

The invention is directed to a wireless communications device which performs signal processing in portable application level software, and more particularly to a software-defined wireless communication device that decouples software-managed hardware profiles from the signal processing functionality of the software.

BACKGROUND OF THE INVENTION

A software-defined wireless communications device, in particular a Software-Defined Radio (SDR), performs all of its signal processing in software.

Since all of the processing is performed in software, a single communications device can be used for many purposes, simply by running a different program. For example, one device can be re-programmed to be an analog cellular phone, a digital phone, a cordless home phone or even a garage door opener or baby monitor.

A software-defined wireless communications device, like the SDR, only requires software upgrades instead of expensive hardware production.

Radiation emitted by RF devices is governed by FCC regulations. To be on the safe side, the FCC typically requires that each combination of hardware and software that a radio supports be tested. The primary justification for mandating joint testing of hardware and software is that this is the only way at the present time to ensure that equipment complies with the technical standards in the FCC rules to prevent interference and to protect users from excessive RF radiation. However, there is no inherent requirement for the software of an SDR to be monolithic.

It would therefore be desirable to separate aspects of the software that do not affect RF emission of wireless devices from those aspects that are directed primarily to the signal processing functionality of the wireless device.

SUMMARY OF THE INVENTION

According to one aspect of the invention, two tiers of software can be employed, hereinafter referred to as Platform Software and Waveform Software. Platform Software manages the aspects of the device that do not change with the waveform. Such aspects include system start-up and shut-down, basic configuration and testing of the hardware devices, and error logging and field test functions. Waveform Software implements the signal processing and state machines that specialize the platform to communicate according to a particular standard (e.g., IS-91 or IS-95). More advanced systems may include routing, a reliable transport layer, or even cognitive radio functionality as part of the Waveform Software.

According to one aspect of the invention, the limits on a particular Waveform Software entity can be encoded as part of the authorization tag downloaded with the software. This is the tag, encrypted or encoded in some other robust means, that informs the communications device that the Waveform Software is authorized to execute on this platform. It is a desirable location to store the limits because the Platform Software decodes this authorization tag before it executes the Waveform Software, so it will have the information it needs to configure hardware limit mechanisms or software checks at the right time. Additionally, if there is a bug in the Waveform Software, this approach ensures that the limit values are not corrupted before they reach the Platform Software. Putting the limit values in a standard location opens them up to inspection. Finally, putting the limit values into the robust tag defends them against unauthorized modification, which is important because they directly control the safety issues of greatest concern.

The system can be designed to express the limits in high-level terms (frequency ranges in Hz, power in watts, etc.) to avoid requiring a particular hardware or software mechanism in the platform. In this way, the Waveform Software, although not been tested on that device, can be safely executed without posing a risk of excessive RF radiation or interference outside its approved frequency bands.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF ILLUSTRATED EMBODIMENTS

Figure 1:
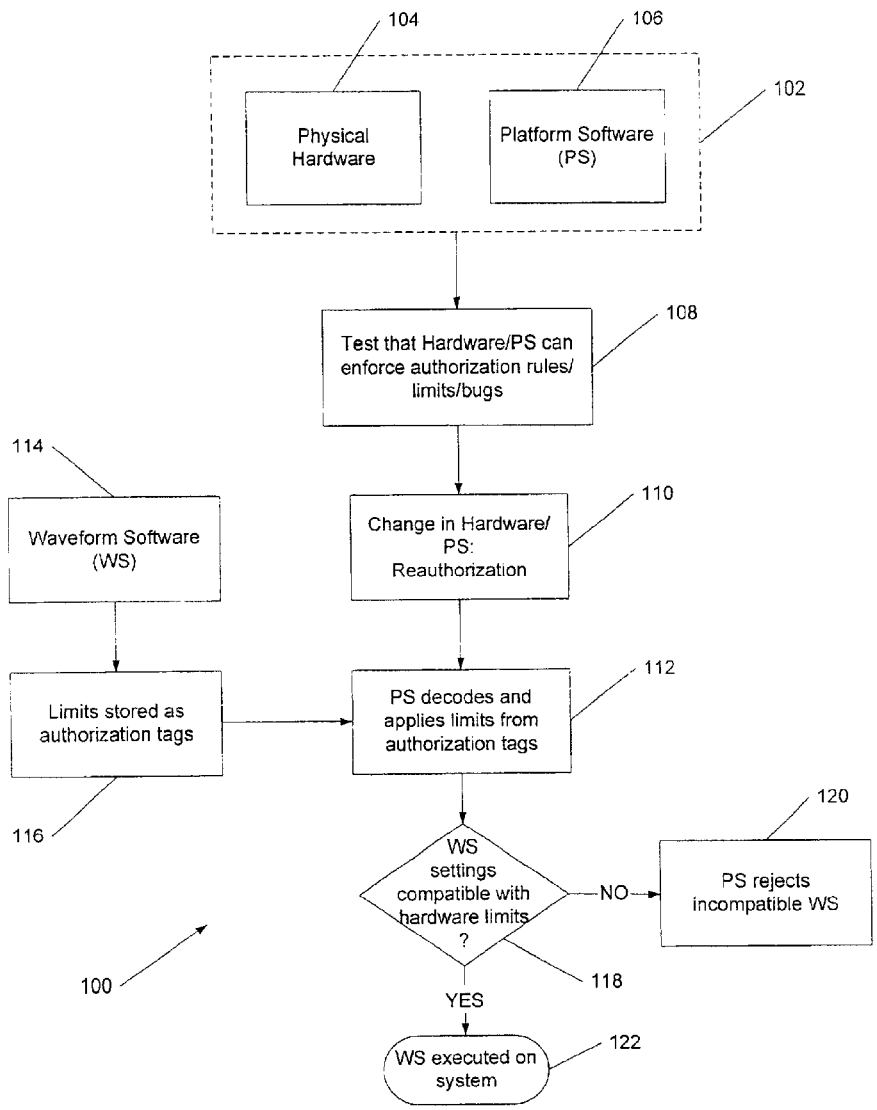
FIG. 1 is a schematic process diagram of a first embodiment of a software-operated wireless communication device.

The invention is directed to a wireless communication device that is defined by software. More particularly, the invention is directed to a software-operated wireless communication device that decouples software-managed hardware profiles from the signal processing functionality of the software.

Under FCC rules, the hardware of wireless devices in general and each combination of hardware and Platform Software has to be certified to conform with FCC requirements. In this application, methods are described that allow certification of Waveform Software independent from certification of the Platform Software and of the hardware on which the Waveform Software runs. Separate development and certification of Waveform and Platform Software is desirable from a regulatory perspective because it will simplify the enforcement of power and frequency limits on RF emissions, it will facilitate testing of such limits and authorization of software and will reduce the risks associated with software bugs.

A device employing this architecture offers significant benefits. From a business perspective, this architecture allows more rapid adoption of new technologies, lower cost adoption of new technologies, increased useful life of mobile and fixed hardware and improved software development practices. From a regulatory perspective, limits on the power and frequency of RF emissions will be easier to implement and to verify, software authentication will be facilitated and devices will be less likely to exceed emission limits as a result of bugs. Failure to permit independent certification of Waveform Software would create unnecessary costs for Waveform Software development and reduce the flexibility of software radio devices. Such a failure would also decrease the ability and incentive of software developers to thoroughly test software by decreasing the capability of amortizing software development costs over a larger number of waveforms and applications.

Independent certification of Waveform Software can facilitate changes to the Waveform Software, enabling the owner of a device, a service provider, a seller of Waveform Software, or the original device manufacturer to change the functionality of a device by loading in new Waveform Software. Conversely, initially only the manufacturer of a device could feasibly make changes to Platform Software. Platform Software can be built independent of the Waveform Software, to minimize the engineering cost and effort of adding a new waveform to a platform or developing a new platform and moving previous waveforms to it. Manufacturers also will thoroughly test the Platform Software on the hardware platform in isolation, before the Waveform Software is installed, to reduce the engineering cost of testing and debugging the more complex combined system.

Platform Software is the most sensible place to enforce limits on transmit power, frequency and modulation and Waveform Software is the most sensible place in which to encode the limits associated with a particular waveform. The Platform Software can enforce specified limits on the Waveform Software by checking the ways in which the Waveform Software configures the hardware and rejecting those that violate the specified limits. This process could include ensuring that configuration of the hardware properly initializes the hardware to perform ongoing monitoring of operation of the radio.

This is a minor extension of the Platform Software's role in promoting portability of Waveform Software. If the Platform Software configures the hardware under high-level control of the Waveform Software, as is desirable for portability, then the Platform Software can check the settings against the FCC-specified limits during configuration. This aspect of Platform Software is similar to the functionality of a "device driver" in operating systems. Device drivers perform extensive checks on configuration requests by applications. Management of hardware devices that enforce the limits is a natural extension of the Platform Software's role in managing all the hardware of the system. It will be assumed that the limits on frequency and power are known to the Platform Software. The following discussion will describe mechanisms by which the Platform Software can learn this information.

In the following, two separate testing and authorization processes will be described that optimize the benefits inherent in separating Waveform Software from Platform Software, while preserving the FCC guidelines. One process is directed to the combination of a particular hardware device with a particular instance of Platform Software, with the other process directed to a particular instance of Waveform Software.

Referring first to FIG. 1, in a process 100 to comply with the FCC regulations, each platform 102 of Physical Hardware 104 and Platform Software (PS) 106 is tested, step 108, to confirm that it is capable of enforcing authorization rules governing the Waveform Software (WS) 114 that may be executed on the platform 102. Note that the primary concern is whether the operating parameter limits encoded with the waveform, expressed as a soft label or otherwise, are limits appropriately approved for that waveform. This is different from certifying the Waveform Software instance itself in combination with this particular platform. In other words, it is not necessary to certify the combination of each Waveform Software with each available hardware/PS.

The authorization rules are set up to demonstrate that the WS/PS/hardware combination can sufficiently enforce whatever operating parameter limits are specified for a particular instance of Waveform Software, irrespective of the behavior of the Waveform Software or user input. Moreover, the authorization rules ensure that the WS/PS/hardware combination can sufficiently defend the Platform Software against corruption due to failures in Waveform Software, ensuring safety limits implemented in the Platform Software will remain despite Waveform Software bugs.

A change in Platform Software that could potentially affect its behavior in any of the areas described above may require reauthorization. Reauthorization may hence be necessary for each new combination of hardware and Platform Software previously authorized as a software-defined radio, step 110.

For each instance of Waveform Software, compliance with the applicable FCC requirements for the frequencies in which the waveform will operate, will have to be demonstrated. If no restrictions apply to licensees on how use their allocated frequency bands, no test data would need to be submitted in this case. In other cases, Waveform Software compliance would have to be demonstrated based on actual tests. This can be achieved in the example depicted in FIG. 1, for example, by allowing Waveform Software to be executed on a software-defined radio if tags and/or additional tags supplied by or on behalf of the FCC are present. Once the Waveform Software 114 is certified on a single platform 102, it may be safe to execute the same Waveform Software on multiple platforms in the field, because the limitations encoded in the tags and enforced by the Platform Software prevent unsafe operation. The authorization tags can be supplied by the WS 114, as indicated in step 116.

The extremely high reliability of the software in current communications devices is due in large part to the nature of the task it performs. Current software has very few decision points when compared to a standard desktop application, and so it is feasible to test it thoroughly. However, any additional feature, such as Waveform Software support for cognitive radio functionality, spectrum sharing, and optimizing performance under varying weather, noise, or multipath conditions, will make it impossible or impracticable to test thoroughly. Each of these features adds decision points to the software. As software grows in this direction, bugs begin to have subtle and non-linear effects. At the same time, it becomes impossible to fully test all states the system can reach due to a combinatorial explosion in the number of states.

It is possible to achieve very high confidence in the correct operation of software with much state and many decision points, even though not all states are fully tested. A testing methodology called Modified Condition-Decision Coverage (MCDC) is considered state of the art for this task. MCDC is used to certify avionics software, under RTCA/DO-178B. Unfortunately, MCDC is so expensive that mandating it or a similar methodology for use in software defined radios would make them uneconomical compared to hardware radio designs. All known economically feasible testing methods provide a low enough level of guarantee that it seems likely that some bugs will survive the testing process.

The Platform Software 106 decodes the authorization tags and enforces the specified limits of the authorization tags, step 112. This will cause the system to perform more safely given the possibility of Waveform Software bugs. Platform Software bugs are expected to occur much less frequently than Waveform Software since PS changes less frequently and can therefore be tested more thoroughly. Therefore the chance of an error occurring in the Platform Software during field operation can economically be driven much lower than the chance of an error in Waveform Software. Additionally, there would have to be a combination of a bug in the Platform Software and a bug in the particular Waveform Software it is running for an unsafe transmission to occur. As the Waveform and Platform Software will be developed and tested independently, the chance of a common-mode bug should be quite low. If the Waveform Software settings are compatible with the PS/hardware limits, as determined in step 118, the WS will be executed on the system, step 122, otherwise the PS rejects the incompatible WS, step 120.

It will be important to protect Platform Software (code and data values) from accidental change by Waveform Software, or the reliability benefits provided by Platform Software will be compromised. Many mechanisms are available to enforce the separation. The Platform Software can function as a true operating system, using virtual memory and privilege level hardware support in the processor to limit Waveform Software to an address space in which it cannot directly access either the hardware or the Platform Software. The Platform Software can run the Waveform Software in a virtual machine, as is done in the Java language system. The Platform Software can execute on a different processor and memory subsystem than the Waveform Software. Other complex mechanisms have recently been developed by the computer science community.

Figure 2:
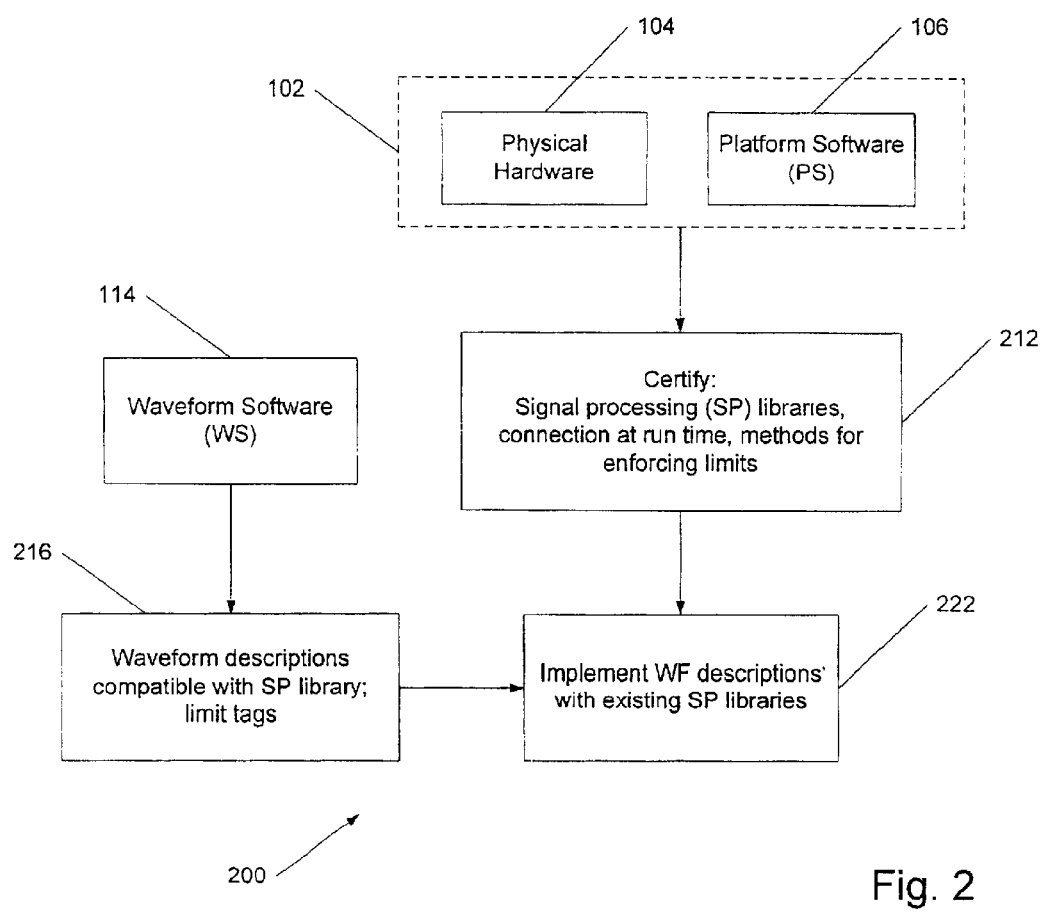
FIG. 2 is a schematic process diagram of a second embodiment of a software-operated wireless communication device.

According to an alternative software partitioning method 200 depicted in FIG. 2, software running on a software-defined wireless communications device distinguishes between a description of the waveform and the implementation of that description, including the underlying platform. The advantage of this decomposition is that it facilitates changing the functionality of the software-defined wireless communications device, conceivably including downloads, for example from a remote site, of waveforms that were initially not authorized to be executed on the software-defined wireless communications device, without the need to re-certify the software-defined wireless communications device. Only the description of the waveform would need to be certified in cases where the description is not compatible with the signal processing library of the platform software.

Under this approach, the platform 102 of Physical Hardware 104 and Platform Software (PS) 106 of a software-defined wireless communications device would initially be certified, as shown in step 212, by:

a) validating each component of the signal processing libraries residing in the software-defined wireless communications device;

b) validating a method of connecting the relevant signal processing libraries at run time; and c) validating a method for enforcing limits on RF emission.

After this initial certification 212, descriptions of various waveforms of the Waveform Software 114 could be passed to the software-defined wireless communications device, which the software-defined wireless communications device could then implement (assuming the signal processing libraries residing in the software-defined wireless communications device support the signal processing functions invoked by the waveform), step 216. The description of the waveform would contain the particulars about the waveform as well as tags delineating limits on RF emissions similar to those described above. These tags would ensure that RF emission limits in band and out of band were enforced.

The benefit of this approach is that it would permit new and/or additional waveforms descriptions composed of existing signal processing library components to be downloaded to the software-defined wireless communications device, for example, from a remote server. Assuming the signal processing library can be shown to properly implement a waveform description, only the waveform description would need to be tested because the software-defined wireless communications device will enforce the RF emission limits and assemble the signal processing library components in accordance with the instructions, step 222. Since these components have already been validated, the radio will work in accordance with its description.

The aforedescribed partitioning of, on one hand, hardware and Platform Software and, on the other hand, Waveform Software, in particular the separation between the description of the waveform and the implementation of that description, facilitate the separate development of Waveform Software and Platform Software, which is advantageous both for business reasons and for effective, simple and cost-effective compliance with the FCC regulations.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A software-defined wireless communications device comprising:
   a hardware platform;
   platform software that controls an operating characteristic of the hardware platform;
   waveform software separate from the platform software, the waveform software including authorization tags comprising limit values certified for at least the hardware platform and the platform software, said limit values specifying operating parameters of the hardware platform when the waveform software is executed on the hardware platform.

2. The communication device of claim 1, wherein the limit values encoded in the authorization tags ensure that a RF emission from the communication device is below a specified limit when the waveform software is executed on the hardware platform.

3. The communication device of claim 1, wherein the authorization tags comprise limit values certified for a plurality of hardware platforms, and wherein the waveform software can be ported to another hardware platform included in the authorization tags once the waveform software has been authorized for execution on a first platform included in the authorization tags.

4. The communication device of claim 1, wherein in the event of a change in the hardware platform, the platform software is reauthorized by applying the authorization tags.

5. The communication device of claim 1, wherein the limit values include a power level, a modulation characteristic or a frequency range, or a combination thereof.

6. The communication device of claim 1, wherein the waveform software includes a waveform description and the platform software includes a signal processing library, and wherein the waveform software is executed if the signal processing library contains the waveform description.

7. The communication device of claim 6, wherein the waveform description is certified if the waveform description is not compatible with the signal processing library of the platform software.

8. The communication device of claim 1, wherein the platform software is executed on a processor or memory subsystem different from the waveform software.

9. The communication device of claim 1, wherein the hardware platform is selected from the group consisting of an analog wireless phone, a digital wireless phone, a cordless home phone, and a wireless data transmission device.

10. Method of certifying a software-defined wireless communications device, comprising:

validating a signal processing library residing in the software-defined wireless communications device;

connecting the signal processing library at run time to an application program that includes waveform descriptions;

enforcing limits on RF emission based on device-related authorization tags encoded with the waveform descriptions.

11. The method of claim 10, further including downloading additional waveforms descriptions that are compatible with the signal processing library.

12. The method of claim 10, wherein the limits on RF emission is at least one of a power level, a modulation characteristic and a frequency range.

* * * * *